US009768956B2

(12) United States Patent
Schaefer

(10) Patent No.: US 9,768,956 B2
(45) Date of Patent: Sep. 19, 2017

(54) METHODS AND SYSTEMS FOR FACILITATING COMMUNICATIONS BETWEEN VEHICLES AND SERVICE PROVIDERS

(75) Inventor: Mark S. Schaefer, Sterling Heights, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 1987 days.

(21) Appl. No.: 12/845,517

(22) Filed: Jul. 28, 2010

(65) Prior Publication Data
US 2012/0030467 A1 Feb. 2, 2012

(51) Int. Cl.
*H04L 9/08* (2006.01)

(52) U.S. Cl.
CPC .......... *H04L 9/0866* (2013.01); *H04L 9/0869* (2013.01); *H04L 2209/805* (2013.01); *H04L 2209/84* (2013.01)

(58) Field of Classification Search
None
See application file for complete search history.

(56) References Cited

U.S. PATENT DOCUMENTS

| 7,266,435 B2* | 9/2007 | Wang et al. ..................... 701/36 |
| 7,548,744 B2* | 6/2009 | Oesterling et al. ............ 455/411 |
| 2003/0115460 A1* | 6/2003 | Arai .............................. 713/168 |
| 2004/0068653 A1* | 4/2004 | Fascenda ....................... 713/168 |
| 2004/0073621 A1* | 4/2004 | Sampson ....................... 709/209 |
| 2004/0168081 A1* | 8/2004 | Ladas et al. ................... 713/201 |
| 2004/0185842 A1* | 9/2004 | Spaur et al. ................... 455/420 |
| 2004/0214597 A1* | 10/2004 | Suryanarayana et al. . 455/552.1 |
| 2005/0128068 A1* | 6/2005 | Winick et al. ................. 340/517 |
| 2005/0136892 A1* | 6/2005 | Oesterling et al. ........... 455/411 |
| 2005/0289224 A1* | 12/2005 | Deslippe et al. .............. 709/208 |
| 2008/0175213 A1* | 7/2008 | Hansen .......................... 370/338 |
| 2008/0175379 A1* | 7/2008 | Hansen et al. ................. 380/44 |
| 2009/0136035 A1* | 5/2009 | Lee ............................... 380/270 |

OTHER PUBLICATIONS

"ACL Connection Establishment and Detachment—Connection Setup," Specification of the Bluetooth System, Wireless Connections Made Easy, Core System Package [Controller Volume], Version 2.1+EDR, Jul. 26, 2007, Section 3.1, pp. 696, vol. 2.

* cited by examiner

*Primary Examiner* — Azizul Choudhury
(74) *Attorney, Agent, or Firm* — Lorenz & Kopf, LLP

(57) ABSTRACT

Methods and systems for facilitating communications between a vehicle and a service provider are provided. A first address of a vehicle communication device and a second address of a service provider communication device are obtained at a remote location that is remote to both the vehicle and the service provider. A set of keys, including a first key and a second key, is generated at the remote server. The first key is for use by the vehicle in establishing communications with the service provider, and the second key is for use by the service provider in establishing communications with the vehicle. The first key is provided to the vehicle, and the second key is provided to the service provider.

15 Claims, 4 Drawing Sheets

METHODS AND SYSTEMS FOR FACILITATING COMMUNICATIONS BETWEEN VEHICLES AND SERVICE PROVIDERS

TECHNICAL FIELD

The technical field generally relates to vehicles, and, more particularly, to methods and systems for facilitating communications between vehicles and service providers.

BACKGROUND

Certain vehicles in the marketplace are equipped with communication devices, such as short distance wireless communication devices, for example those marketed using the trademark "Bluetooth". Accordingly, such vehicles may be able to communicate, via their communication devices, with various service providers (for example, vehicle dealerships, service stations, grocery stores, restaurants, and the like) that have similar communication devices. However, the respective communication devices of the vehicle and the service provider would typically need to be "paired" in order for such communications to take place. As used herein, two communication devices are typically considered to be "paired" when an arrangement is established whereby the two communication devices communicate with each other and establish a connection. Such pairing may take time and/or effort on the part of an occupant of the vehicle and/or a representative of the service provider.

Accordingly, it is desirable to provide improved methods for facilitating communications between a vehicle and a service provider, for example that make pairing of the respective communication devices quicker and/or easier. It is also desirable to provide improved systems for such facilitating communications between a vehicle and a service provider. Furthermore, other desirable features and characteristics of the present invention will become apparent from the subsequent detailed description and the appended claims, taken in conjunction with the accompanying drawings and the foregoing technical field and background.

SUMMARY

In accordance with one example, a method for facilitating communications between a vehicle having a first communication device with a first address and a service provider having a second communication device with a second address is provided. The method comprises the steps of obtaining the first address and the second address at a remote location that is remote to both the vehicle and the service provider, generating a set of pairing keys at the remote location, the set of pairing keys comprising a first key for use by the vehicle in establishing communications with the service provider and a second key for use by the service provider in establishing communications with the vehicle, providing the first key to the vehicle, and providing the second key to the service provider.

In accordance with another example, a system for facilitating communications between a vehicle having a first communication device with a first address and a service provider having a second communication device with a second address is provided. The system comprises a processor and a transmitter. The processor is disposed at a remote location that is remote to both the vehicle and the service provider. The processor is configured to generate a set of pairing keys using the first address and the second address. The set of pairing keys comprises a first key for use by the vehicle in establishing communications with the service provider, and a second key for use by the service provider in establishing communications with the vehicle. The transmitter is coupled to the processor, and is configured to transmit the first key to the vehicle and the second key to the service provider.

In accordance with a further example, a method for communicating between a vehicle and a service provider is provided. The method comprises the steps of establishing a communication connection between a first communication device of the vehicle and a second communication device of the service provider, and verifying identities of the first communication device and the second communication device using a set of pairing keys generated at a remote server that is remote from the vehicle and the service provider. The set of pairing keys comprises a first key and a second key. The first key is stored at the vehicle for use in providing an identity of the first communication device to the second communication device. The second key is stored at the service provider for use in providing an identity of the second communication device to the first communication device.

BRIEF DESCRIPTION OF THE DRAWINGS

Certain examples of the present disclosure will hereinafter be described in conjunction with the following drawing figures, wherein like numerals denote like elements, and wherein.

DETAILED DESCRIPTION

The following detailed description is merely exemplary in nature, and is not intended to limit the disclosure or the application and uses thereof. Furthermore, there is no intention to be bound by any expressed or implied theory presented in the preceding technical field, background, or the following detailed description.

Figure 1:
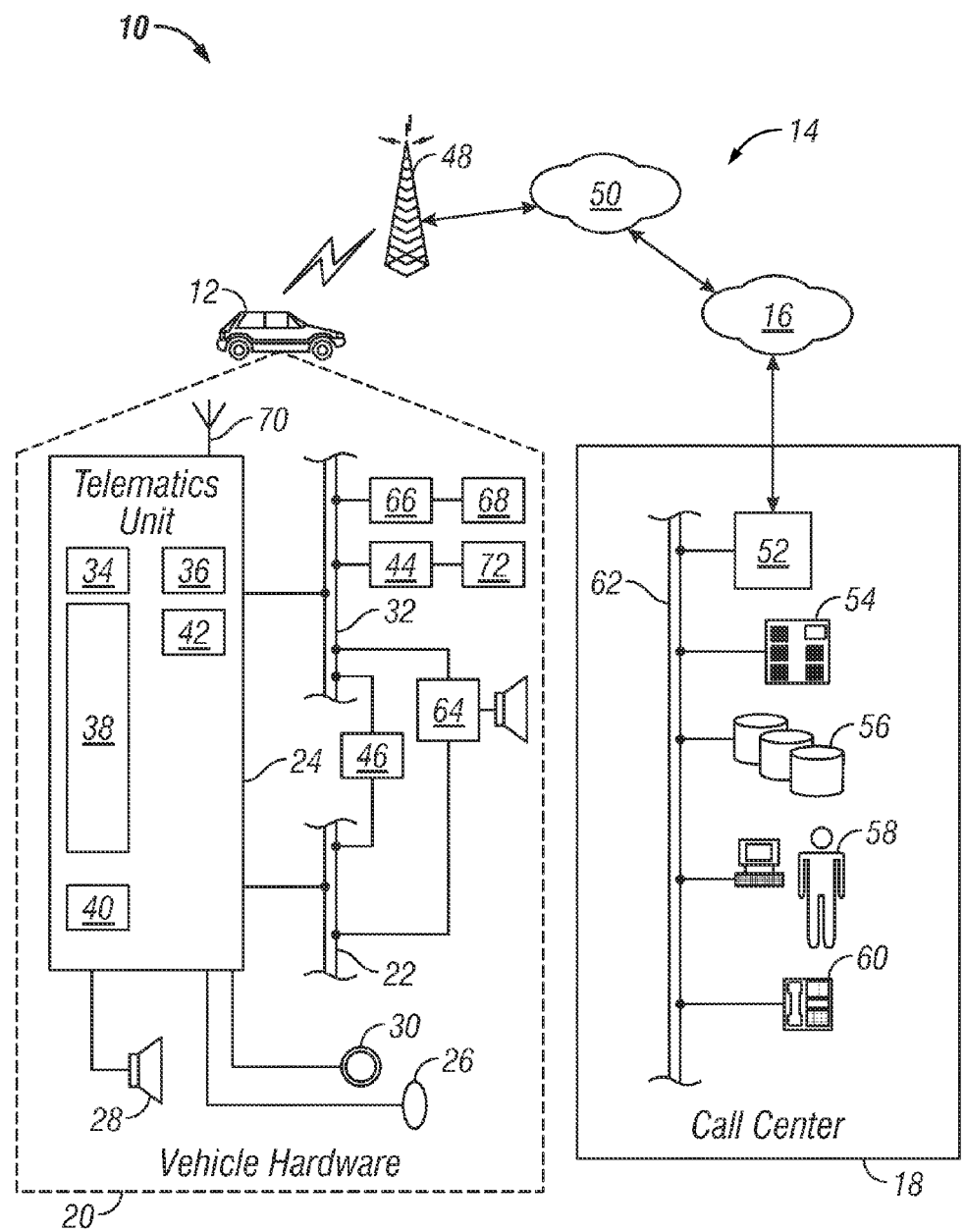
FIG. 1 is an exemplary schematic illustration of a non-limiting example of a communication system.

With reference to FIG. 1, there is shown a non-limiting example of a communication system 10 that may be used together with examples of the systems disclosed herein. The communication system generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, and the like, and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within the electronic processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Figure 2:
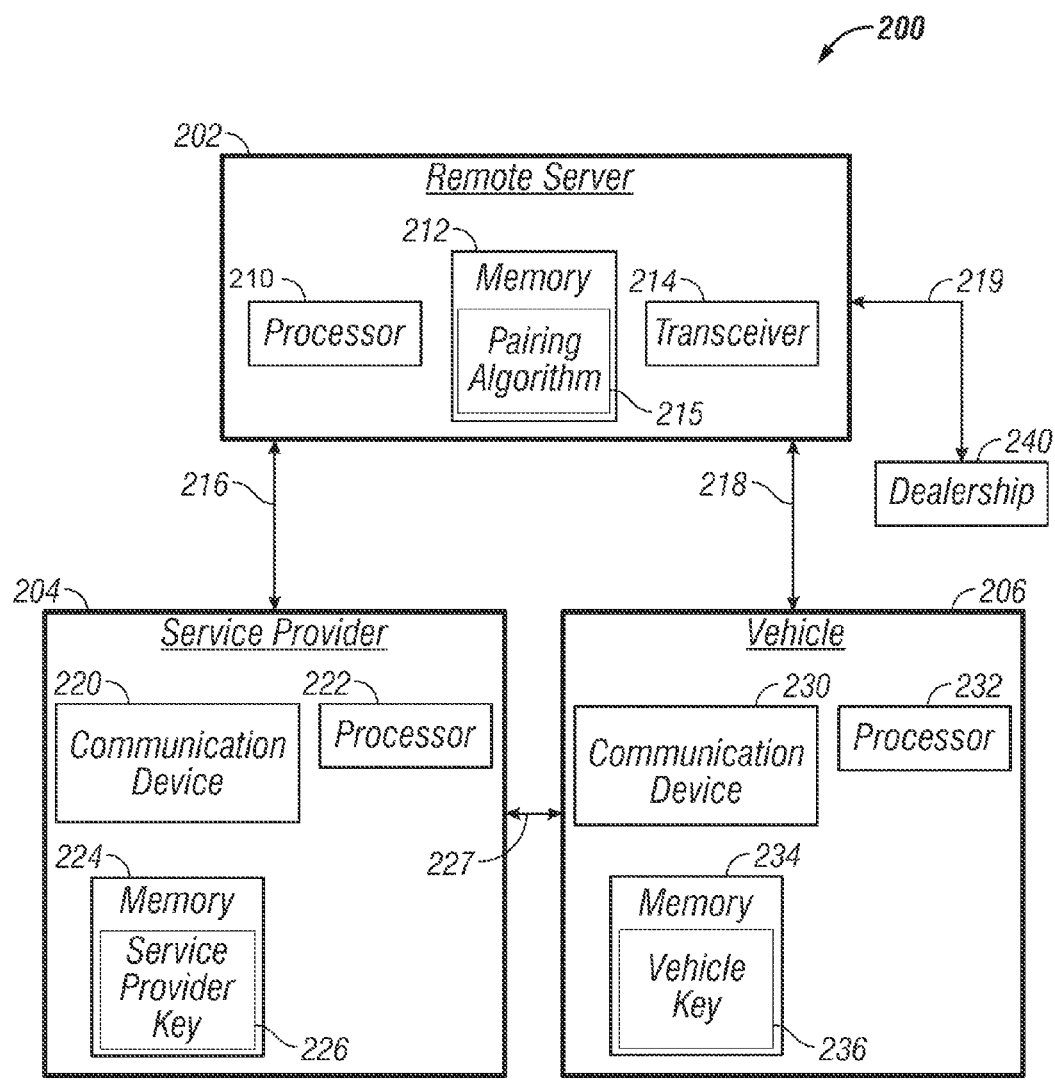
FIG. 2 is an exemplary schematic illustration of a non-limiting example of a pairing and communication system, which can be used in connection with the communication system of FIG. 1.
Figure 3:
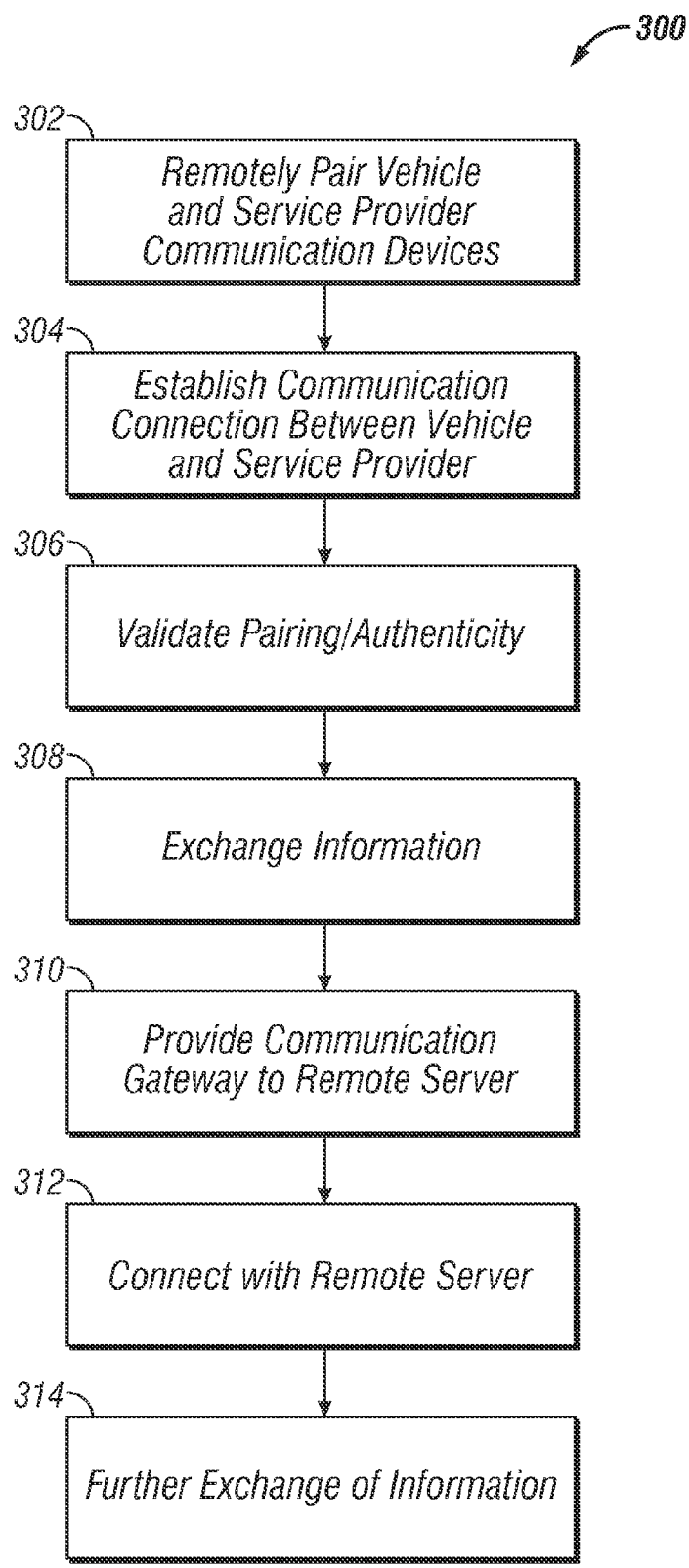
FIG. 3 is a flowchart of a non-limiting example of a method for facilitating communications between a vehicle and a service provider using a remote server, which can be used in connection with the communication system of FIG. 1 and the pairing and communication system of FIG. 2.
Figure 4:
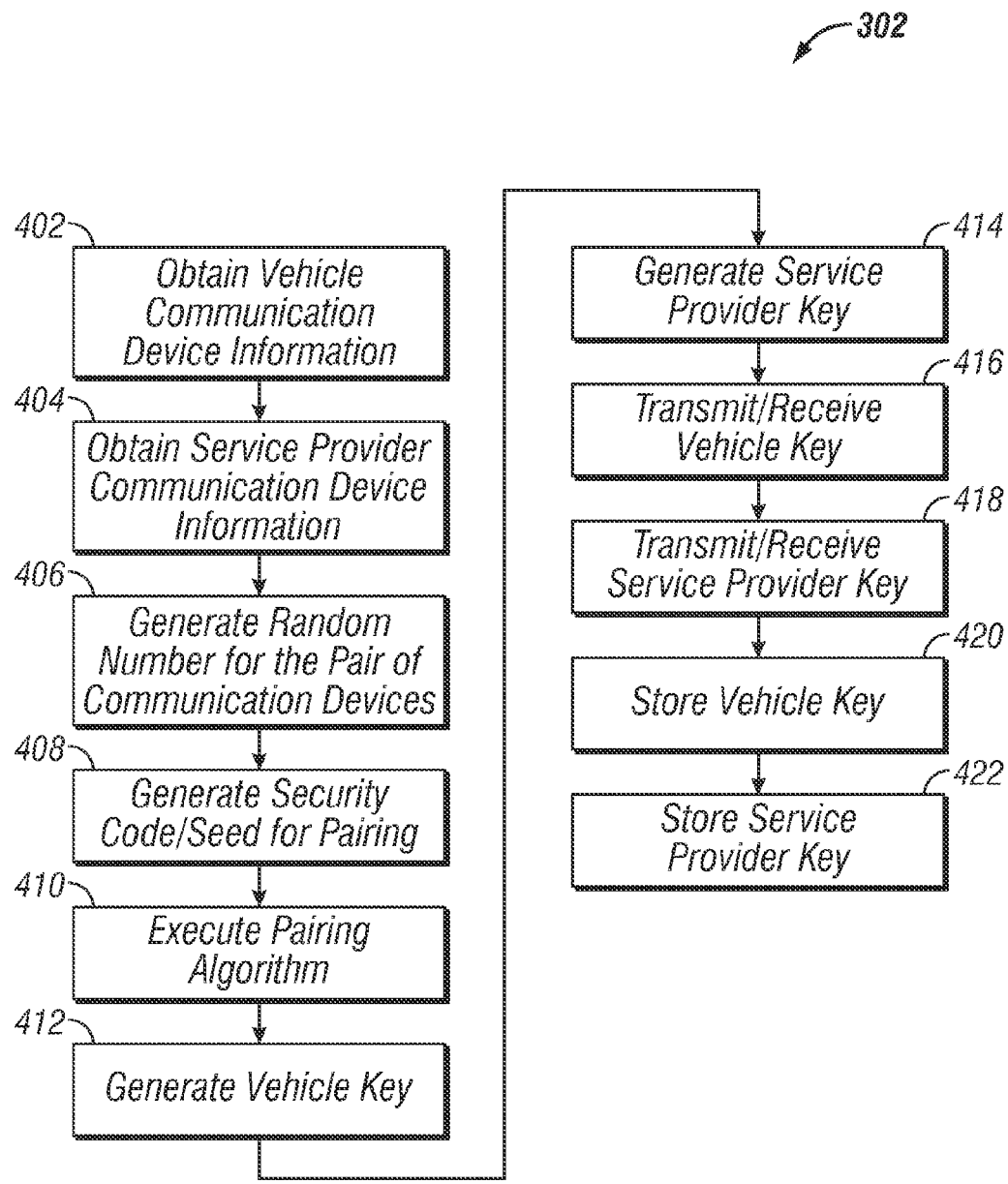
FIG. 4 is a flowchart of a non-limiting example of a sub-process of the method of FIG. 3, namely a sub-process of remotely pairing a communication device of the vehicle with a communication device of the service provider.

In certain examples, the cellular/chipset component 34 may comprise a short range wireless communication device, for example such as those marketed using the trademark "Bluetooth". In addition, the telematics unit 24, the cellular chipset/component 34, and various other components of the communication system 10 may be implemented in connection with a pairing and communication system, for example as depicted in FIG. 2 and described further below in connection therewith. In addition, the telematics unit 24, the cellular chipset/component 34, and various other components of the communication system 10 may also be implemented in connection with a process for facilitating communications between the vehicle and service providers, such as vehicle dealerships, service stations, grocery stores, restaurants, and the like, for example as depicted in FIGS. 3 and 4 and described further below in connection therewith.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware 20 components. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Exemplary vehicle sensors include but are not limited to gyroscopes, accelerometers, magnetometers, emission detection, and/or control sensors, and the like. Exemplary sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof. The vehicle 12 also preferably communicates with one or more service providers (for example, vehicle dealerships, service stations, grocery stores, restaurants, and the like) in a similar fashion via the land network and/or the wireless carrier system 14 via respective communication devices (preferably, short distance wireless communication devices) of the vehicle 12 and the service provider.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

FIG. 2 is an exemplary schematic illustration of a non-limiting example of a pairing and communication system 200, which can be used in connection with the communication system 10 of FIG. 1. The pairing and communication system 200 includes a remote server 202, a service provider 204, and a vehicle 206.

In one example, the pairing and communication system 200 comprises the communication system 10 of FIG. 1 and/or components thereof, the remote server 202 comprises the call center 18 of FIG. 1 and/or components thereof, and the vehicle 206 comprises the vehicle 12 of FIG. 1 and/or components thereof. In another example, the remote server 202 is located at the call center 18 of FIG. 1. In still another example, communications to and/or from the remote server 202 may be made and/or directed through and/or otherwise using the call center 18 of FIG. 1. The service provider 204 may be any type of entity that provides goods or services that may be offered for the vehicle and/or occupants thereof. For example, the service provider 204 may include, among various other possibilities, a vehicle dealership, a service station, a grocery store, a restaurant, and the like.

The remote server 202 is communicatively coupled between the service provider 204 and the vehicle 206. The remote server 202 communicates with the service provider 204 via a first communication network 216 and with the vehicle 206 over a second communication network 218. In one example, the remote server 202 also communicates with a dealership 240 (which may be the same as or different from the service provider 204, depending on the example) via a third communication network 219. In one example, the dealership 240 is a dealership from which the vehicle 206 was originally purchased. In another example, the dealership 240 may be any dealership where the vehicle is regularly serviced.

In one example, the first communication network 216, the second communication network 218, and the third communication network 219 comprise the same network, preferably a long range wireless network, such as a cellular wireless network. In one example, the first communication network 216 comprises a VPN or Internet network wherein a service provider may contact the remote server 202, the second communication network 218 comprises a wireless long-range network (such as the wireless carrier system 14 of FIG. 1), and the third communication network 219 comprises a private wired network (such as an Intranet) already existing between the remote server 202 and the dealership 240.

The remote server 202 includes a processor 210, a memory 212, and a transceiver 214. The processor 210 executes a pairing algorithm 215 that remotely pairs respective communication devices of the service provider 204 and the vehicle 206 (namely, the service provider communication device 220 and the vehicle communication device 230). The pairing algorithm 215 is preferably stored in the memory 212 of the remote server 202. The pairing algorithm 215 generates a set of pairing keys, namely a service provider key 226 and a vehicle key 236. The service provider key 226 is used by the service provider in establishing communications with the vehicle (and, preferably, is used by the service provider communication device 220 in establishing its identity and authenticity for communicating with the vehicle communication device 230). The vehicle key 236 is used by the vehicle in establishing communications with the service provider (and, preferably, is used by the vehicle communication device 230 in establishing its identity and authenticity for communicating with the service provider communication device 220).

The processor 210 remotely pairs the service provider communication device 220 and the vehicle communication device 230, preferably via steps of the process 300 depicted in FIGS. 3 and 4 and described further below in connection therewith. In addition, the processor 210 preferably also facilitates information flow between the service provider 204 and the vehicle 206 during communications therebetween, preferably also via steps of the process 300 depicted in FIGS. 3 and 4 and described further below in connection therewith. As used herein, two communication devices are typically considered to be "paired" when an arrangement is established whereby the two communication devices communicate with each other and establish a connection.

In one example, the transceiver 214 comprises a single transceiver. In another example, the transceiver 214 comprises a separate transmitter and receiver. The transceiver 214 (and/or a receiver thereof) receives addresses of the service provider communication device 220 and the vehicle communication device 230 for use with the pairing algorithm 215. As used herein, the "addresses" of the communication devices 220, 230 preferably comprise unique BD_ADDR addresses of the respective devices. In one example, the address of the vehicle communication device 230 comprises a BD_ADDR of the telematics unit 24 of FIG. 1. In certain examples, multiple communication devices 220, 230 may be assigned the same address. For example, service provider communication devices 220 of dealerships of a certain brand of vehicle may be assigned the same, common address, and would then have access to the same set of keys.

The address for the service provider communication device 220 is preferably obtained by the remote server 202 from the service provider 204 via the first communication network 216. In one example, the address for the vehicle communication device 230 is obtained by the remote server 202 from the vehicle 206 via the second communication network 218. In another example, the address for the vehicle communication device 230 is obtained by the remote server 202 from the dealership 240 via the third communication network 219. In still another example, the address for the vehicle communication device 230 is obtained by the remote server 202 from a manufacturer of the vehicle communication device 230. In yet another example, the address for the vehicle communication device 230 is generated and assigned by the remote server 202.

The addresses are preferably stored in the memory 212 and retrieved therefrom by the processor 210 when needed by the processor 210. In addition, the transceiver 214 (and/or a transmitter thereof) transmits the service provider key 226 to the service provider 204 via the first communication network 216, and transmits the vehicle key 236 to the vehicle 206 via the second communication network 218. In certain examples, the service provider key 226 and/or the vehicle key 236 may also be stored in the memory 212 of the remote server 202.

The transceiver 214 (and/or a receiver thereof) also preferably receives other information pertaining to the service provider 204 and the vehicle 206 (such as information as to the identities of the service provider 204 and the vehicle 206 and/or occupants and/or representatives thereof, user information and/or history regarding the vehicle 206, and goods and services offered by the service provider 204, among various other possible information related thereto). Such other information may be used for pairing the service provider communication device 220 and the vehicle communication device 230 and for use in facilitating information flow between the service provider 204 and the vehicle 206 during communications therebetween.

The other information regarding the service provider communication device 220 is preferably obtained by the remote server 202 from the service provider 204 via the first communication network 216. In one example, the other information pertaining to the vehicle communication device 230 is obtained by the remote server 202 from the vehicle 206 via the second communication network 218. In another example, the information pertaining to the vehicle communication device 230 is obtained by the remote server from the dealership 240 via the third communication network 219. The other information pertaining to the vehicle communication device 230 and the service provider communication device 220 is preferably stored in the memory 212 and retrieved therefrom by the processor 210 when needed by the processor 210.

The transceiver 214 (and/or a transmitter thereof) also preferably provides a sequence of queries, and/or other instructions and/or related material to the service provider 204 and/or the vehicle 206 to facilitate communications between the service provider 204 and the vehicle 206 using the other information referenced above. Specifically, in one example, the transceiver 214 (and/or a transmitter thereof) provides instructions to the service provider communication device 220 via the first communication network 216 that the service provider 204 may utilize for requesting information (such as vehicle history, odometer values, tire pressures, oil levels, battery state of charge, vehicle system health and/or usage, and/or various other vehicle data or information) from the vehicle 206. In another example, the transceiver 214 (and/or a transmitter thereof) provides information or content to the vehicle communication device 230 via the second communication network 218, the information or content pertaining to goods and/or services offered by the service provider 204 (preferably including, for example, the nature of such goods and/or services, the costs of such goods and/or services, ordering information, and the like).

The service provider 204 includes the above-referenced service provider communication device 220 as well as a processor 222 and a memory 224. The service provider communication device 220 preferably comprises a short distance wireless communication device, such as a cellular telephone and/or device, for example such as a device that is marketed using the trademark "Bluetooth". The processor 222 assists with controlling the service provider communication device 220 and in processing information and/or instructions obtained from and provided to the remote server 202 and the vehicle 206. The memory 224 stores the above-referenced service provider key 226. In certain examples, the service provider communication device 220, the processor 222, and/or the memory 224 may comprise a single device and/or may be co-located together.

The vehicle 206 includes the above-referenced vehicle communication device 230 as well as a processor 232 and a memory 234. The vehicle communication device 230 preferably comprises a short distance wireless communication device, such as a cellular telephone and/or device, for example such as a device that is marketed using the trademark "Bluetooth". The processor 232 assists with controlling the vehicle communication device 230 and in processing information and/or instructions obtained from and provided to the remote server 202 and the service provider 204. The memory 234 stores the above-referenced vehicle key 236. In certain examples, the vehicle communication device 230, the processor 232, and/or the memory 234 may comprise a single device and/or may be co-located together.

The service provider 204 and the vehicle 206 communicate via the respective communication devices 220, 230 along a fourth communication network 227. The fourth communication network 227 preferably comprises a wireless network, most preferably a short range wireless network, such as a network used in connection with the trademark "Bluetooth". Specifically, when communications are established between the service provider 204 and the vehicle 206, the respective communication devices 220, 230 validate their identities using the pairing keys 226, 236 previously stored in their respective memories 224, 234, following the remote pairing performed by the remote server 202 that occurs prior to the establishment of communications between the service provider and the vehicle 206. Following the validation, the service provider 204 and the vehicle 206 share information, for example as facilitated by the remote server 202 in connection with the above-described example.

FIG. 3 is a flowchart of a non-limiting example of a process 300 for facilitating communications between a vehicle and a service provider using a remote server, which can be used in connection with the communication system 10 of FIG. 1 and the pairing and communication system 200 of FIG. 2. In one example, the vehicle corresponds to the vehicle 12 of FIG. 1 and the vehicle 206 of FIG. 2, the service provider corresponds to the service provider 204 of FIG. 2, and the remote server corresponds to the call center 18 of FIG. 1 and the remote server 202 of FIG. 2.

In the depicted example, the process 300 begins with a remote pairing of respective communication devices of the vehicle and the service provider (step 302). The vehicle and service provider communication devices preferably correspond to the vehicle communication device 230 and the service provider communication device 220 of FIG. 2, respectively.

In certain examples, the remote pairing may be requested by the service provider, by customer interaction, or by an automated process. For example, a customer may bring the vehicle to the dealership and the dealership's communication device may not recognize the vehicle's communication device, so that the dealership may request the remote server begin the pairing process. Also in certain examples, the customer may "opt in" to a relationship with one or more service providers through a service provider website or through a website or advisor located in the call center. In addition, in certain examples, the sale of a vehicle by a dealership may trigger an automated process through which the keys are generated and stored in the respective memories of the dealership and the vehicle using the remote server.

A preferred, non-limiting example of the step of the remote pairing of the respective communication devices is depicted in FIG. 4, and will now be described in connection therewith. As depicted in FIG. 4, the step or sub-process 302 of the remote pairing of the respective communication devices begins with the step of obtaining vehicle communication device information (step 402). The vehicle communication device information includes an address for the vehicle communication device. The address for the vehicle communication device preferably comprises a unique BD_ADDR address of the vehicle communication device, and most preferably of the telematics unit 24 of FIG. 1 that was assigned at the time of manufacture. In one example, the communication device information includes a unique vehicle identifier (VIN) mapped to a unique telematics unit identifier (herein referred to as a STID, or station identifier), and the STID would be mapped to a unique BD_ADDR address. Thus, a service provider or dealership could request a connection with a VIN, rather than a STID or BD_ADDR address, because the vehicle need not be physically present during process 400.

In certain examples, the vehicle communication device information also includes additional information, such as a name and an address of an owner and/or driver of the vehicle, a make, model and year of the vehicle, possible service needs of the vehicle, an identification of the owner, and/or the driver, and the like. In one example, the vehicle communication device information is obtained by the remote server 202 of FIG. 2 from the vehicle 206 of FIG. 2 via the second communication network 218 of FIG. 2. In another example, the vehicle communication device information is obtained by the remote server 202 of FIG. 2 from the dealership 240 of FIG. 2 at which the vehicle 206 was originally purchased, via the third communication network 219 of FIG. 2. In another example, the vehicle communication device information is provided at time of manufacture by the telematics unit supplier and/or vehicle manufacturer.

In addition, service provider communication device information is obtained (step 404). The service provider communication device information includes an address for the service provider communication device. The address for the service provider communication device preferably comprises a unique BD_ADDR address of the service provider communication device, and most preferably of a short range wireless module thereof that was assigned at the time of manufacture. In certain examples, the communication device address could instead be assigned by various means. For example, as is the case with Ethernet Identifiers (MAC), while there is a native/preferred MAC (BD_ADDR), the BD_ADDR address can be assigned programmatically (for example, stored in memory and assigned while the communication device is initializing).

In certain examples, the service provider communication device information also includes additional information, such as a name and an address of the service provider and/or an owner and/or other representative thereof, goods and services offered by the service provider and costs and/or other information pertaining thereto, and the like. The service provider communication device information is preferably obtained by the remote server 202 of FIG. 2 from the service provider 204 via the first communication network 216 of FIG. 2. Alternatively, in certain examples, the service provider communication device information could be generated and provided by the remote server (202) via the first communication network 216.

A random number or pseudo-random number is generated (step 406). The random number is preferably generated by the remote server 202 of FIG. 2. Specifically, the random number is most preferably selected by the processor 210 of FIG. 2 from a collection of possible random numbers stored in the memory 212 of FIG. 2.

In addition, a security code is generated (step 408). The security code is preferably generated by the remote server 202 of FIG. 2. Specifically, the security code is most preferably selected by the processor 210 of FIG. 2 from a collection of possible security codes stored in the memory 212 of FIG. 2. In one example involving communication devices using short range wireless technology such as that sold in connection with the Bluetooth trademark, the security code is generated using the random or pseudorandom number generated in step 406. In Bluetooth terminology, the security code is often referred to as the PIN. The Bluetooth Pairing process is described briefly in FIG. 3.10 of the Core 2.1+EDR Bluetooth specification (page 696). The random number is referred to as "LMP_in_rand" and the security code/PIN is in "User Inputs PIN Code". As can be seen, the algorithm is deterministic with those two values. This is referenced in Step 7b in the Bluetooth specification.

A pairing algorithm is then executed (step 410). The pairing algorithm preferably corresponds to the pairing algorithm 215 stored in the memory 212 of FIG. 2, and is executed by the remote server 202. Specifically, the pairing algorithm is most preferably executed by the processor 210 of FIG. 2 utilizing the communication addresses of steps 404 and 406, and further using the security code of step 408 as a seed for the pairing algorithm.

A set of pairing keys are generated, namely a vehicle key (step 412) and a service provider key (step 414). The vehicle key is used by the vehicle in establishing communications with the service provider, and preferably corresponds to the vehicle key 236 of FIG. 2. The service provider key is used by the service provider in establishing communications with the vehicle, and preferably corresponds to the service provider key 226 of FIG. 2. The vehicle and service provider keys are preferably generated by the processor 210 using the pairing algorithm 215 of FIG. 2 and the same random number and security code.

Preferably, the service provider key 226 includes the address of the vehicle communication device, the security code, and the random number. Similarly, the vehicle key 236 preferably includes the address of the service provider communication device, the security code, and the random number. Accordingly, the service provider communication device can subsequently utilize its service provider key to establish its identity with the vehicle, and the vehicle can also utilize its vehicle key to establish its identity with the service provider in initiating subsequent communications. In one example involving communication devices using short range wireless technology such as that sold in connection with the Bluetooth trademark, the BD_ADDR address and the link keys (226/236) are all that is needed for communication. In such an example, the security code and the random number do not need to be stored in memory, but are merely input in the algorithm to generate the corresponding link keys.

The vehicle key of step 412 is transmitted by the remote server and received by the vehicle (step 416). Preferably, the vehicle key is transmitted by the transceiver 214 (or a transmitter thereof) of FIG. 2 to the vehicle communication device 230 of FIG. 2 along the second communication network 218 of FIG. 2 for storage at the vehicle.

In addition, the service provider key of step 414 is transmitted by the remote server and received by the service provider (step 418). Preferably, the service provider key is transmitted by the transceiver 214 (or a transmitter thereof) of FIG. 2 to the service provider communication device 220 of FIG. 2 along the first communication network 216 of FIG. 2 for storage at the service provider.

The vehicle key is then stored at the vehicle (step 420). The vehicle key is preferably stored in the vehicle memory 234 of FIG. 2. Alternatively, the vehicle key may be stored in the vehicle communication device 230, for example in a memory thereof.

In addition, the service provider key is stored at the service provider (step 422). The service provider key is preferably stored in the service provider memory 224 of FIG. 2. Alternatively, the service provider key may be stored in the service provider communication device 220, for example in a memory thereof.

The sub-process 302 thereby remotely pairs the respective communication devices of the vehicle and the service provider with a pairing algorithm that utilizes respective addresses of the communication devices along with the same, shared random number and security code generated by the remote server. Accordingly, when the vehicle subsequently encounters or approaches the service provider, the respective communication devices will be already paired, thereby facilitating communications therebetween without requiring any typing in of security codes or other pairing steps after the vehicle is in proximity to the service provider.

Returning now to FIG. 3, the process continues with the establishment of a wireless communication connection between the vehicle and the service provider (step 304). This step occurs after the remote pairing of the sub-process 302, and after the vehicle and the service provider are subsequently in a vicinity of one another (for example, within range of the respective communication devices of the vehicle and the service provider, or some other predetermined threshold distance). The communication connection is preferably established by the service provider communication device 220 and the vehicle communication device 230 of FIG. 2.

The service provider and the vehicle then validate the authenticity and/or pairing of one another (step 306). In one example involving communication devices using short range wireless technology such as that sold in connection with the Bluetooth trademark, the keys are not exchanged during connection establishment, but are used to provide one half of a symmetric algorithm to generate a connection key.

Alternatively, in another example, during step 306, the service provider communication device provides the service provider key to the vehicle communication device for validation by the vehicle communication device and/or the vehicle processor. In one such example, the vehicle communication device and/or the vehicle processor validate the service provider key by confirming that the address of the service provider key represents the address of the vehicle communication device, and by confirming that the random number and security code of the service provider key represents the same random number and security code used in the vehicle key. Similarly, in one example, during step 306, the vehicle communication device provides the vehicle key to the service provider communication device for validation by the service provider communication device and/or the service provider processor. In one such example, the service provider communication device and/or the service provider processor validate the vehicle key by confirming that the address of the vehicle key represents the address of the service provider communication device, and by confirming that the random number and security code of the vehicle key represents the same random number and security code used in the service provider. In certain examples, step 306 may be optional.

Once the authenticity and/or pairing of the vehicle and the service provider are validated, information is exchanged between the vehicle and the service provider (step 308). In one example, vehicle history, odometer values, tire pressures, oil levels, battery state of charge, vehicle system health and/or usage, and the like are provided by the vehicle to the service provider. Also in one example, a description of various goods and services offered by the service provider, including prices thereof and/or ordering information, are provided by the service provider to the vehicle. In addition, in one example, a secure connection between the vehicle and remote server is utilized to authorize a transaction with a service provider.

In addition, in certain examples, one or more communication gateways are provided to the remote server (step 310). Such a communication gateway may be provided to the vehicle and/or to the service provider. The vehicle and/or the service provider connect with the remote server via the gateway (step 312), and the remote server facilitates the further exchange of information between the vehicle and the service provider (step 314). In one example, the service provider connects to the remote server, and receives a sequence of queries, and/or other instructions and/or other information related to the vehicle (such as an owner name, make, model, and year of the vehicle) that allow the service provider to effectively seek appropriate information (such as vehicle history, odometer values, tire pressures, oil levels, battery state of charge, vehicle system health and/or usage, and/or various other vehicle data or information) from the vehicle. In another example, the vehicle connects to the remote server, and receives information regarding the service provider (preferably including, for example, the name and address of the service provider, the nature of the goods and/or services provided by the service provider, the costs of such goods and/or services, ordering information, and the like) to facilitate the vehicle's ordering and/or use of such goods and/or services from the service provider.

Accordingly, improved methods and systems are provided for facilitating communications between a vehicle and a service provider. A remote server pairs the respective communication devices of the vehicle and the service provider at a remote location (that is remote to both the vehicle and the service provider). This may be accomplished before the vehicle approaches the service station. This allows for a more efficient and effective establishment of communications between the respective communication devices of the vehicle and the service provider. In addition, in certain examples, the remote server also provides a communication gateway for the vehicle and/or the service provider that provides instructions and/or additional content to further facilitate the efficient and effective flow of information between the vehicle and the service provider.

It will be appreciated that the disclosed systems, methods, and components thereof may differ from those depicted in the figures and/or described above. For example, the communication system 10, the telematics unit 24, the cellular/chipset component 34, and/or various parts and/or components thereof may differ from those of FIG. 1 and/or described above. Similarly, the pairing and communication system 200 and/or various parts and/or components thereof may differ from those depicted in FIG. 2, and the process 300 and/or various steps thereof may differ from those depicted in FIGS. 3 and 4 and/or described above.

Similarly, it will be appreciated that, while the disclosed methods and systems are described above as being used in connection with automobiles such as sedans, trucks, vans, and sports utility vehicles, the disclosed systems may also be used in connection with any number of different types of vehicles, and in connection with any number of different systems thereof and environments pertaining thereto.

While at least one example has been presented in the foregoing detailed description, it should be appreciated that a vast number of variations exist. It should also be appreciated that the detailed description represents only examples, and is not intended to limit the scope, applicability, or configuration of the invention in any way. Rather, the foregoing detailed description will provide those skilled in the art with a convenient road map for implementing the examples. It should be understood that various changes can be made in the function and arrangement of elements without departing from the scope of the invention as set forth in the appended claims and the legal equivalents thereof.

What is claimed is:

1. A method for facilitating communications between a vehicle having a first communication device with a first address and a service provider having a second communication device with a second address, the method comprising the steps of:
    obtaining the first address and the second address, along with additional vehicle information pertaining to the vehicle and additional service provider information pertaining to the service provider, via a remote server at a remote location that is remote to both the vehicle and the service provider;
    generating a set of pairing keys via the remote server using the first address and the second address, the set of pairing keys comprising:
        a first key for use by the vehicle in establishing communications with the service provider; and
        a second key for use by the service provider in establishing communications with the vehicle;
    providing the first key to the vehicle;
    providing the second key to the service provider;
    facilitating information flow between the vehicle and the service provider via the remote server using the additional vehicle information and the additional service provider information;
    receiving a notification as to a communication connection between the first communication device and the second communication device; and
    providing instructions to facilitate a flow of information between the first communication device and the second communication device based on the notification, the first address, and the second address;
    wherein the step of providing instructions comprises the step of providing a sequence of queries from the remote server to the service provider using the additional vehicle information for use in obtaining the information from the vehicle.

2. The method of claim 1, further comprising the steps of:
    storing the first key at the vehicle; and
    storing the second key at the service provider.

3. The method of claim 1, wherein the step of generating the first key and the second key comprises the steps of:
    generating a random number;
    generating a security code; and
    executing an algorithm to generate the first key and the second key using the first address, the second address, the random number, and the security code.

4. The method of claim 1, wherein the step of providing instructions comprises the step of providing a description of goods or services offered by the service provider from the remote server to the vehicle using the additional service provider information.

5. The method of claim 1, further comprising:
    pairing the vehicle and the service provider via the remote server using the additional vehicle information and the additional service provider information.

6. The method of claim 1, wherein the additional vehicle information comprises a history of the vehicle.

7. The method of claim 1, wherein the additional service provider information comprises goods or services offered by the service provider.

8. The method of claim 1, wherein the first address corresponds to a mapping of a vehicle identifier of the vehicle and a telematics unit identifier of a telematics unit of the vehicle.

9. The method of claim 1, wherein different service providers of a particular brand of vehicle are assigned a same, common second address corresponding to the particular brand.

10. The method of claim 9, further comprising:
    pairing the vehicle and the service provider via the remote server using a brand of the vehicle and the common address of the service provider corresponding to the brand.

11. A system for facilitating communications between a vehicle having a first communication device with a first address and a service provider having a second communication device with a second address, the system comprising:

a processor disposed in a remote location that is remote to the vehicle and the service provider, the processor configured to:
- obtain the first address and the second address, along with additional vehicle information pertaining to the vehicle and additional service provider information pertaining to the service provider;
- generate a set of pairing keys using the first address and the second address, the set of pairing keys comprising:
  - a first key for use by the vehicle in establishing communications with the service provider; and
  - a second key for use by the service provider in establishing communications with the vehicle; and
- facilitate information flow between the vehicle and the service provider using the additional vehicle information and the additional service provider information; and a transmitter coupled to the processor and configured to:
- transmit the first key to the vehicle; and
- transmit the second key to the service provider;

wherein the first address corresponds to a mapping of a vehicle identifier of the vehicle and a telematics unit identifier of a telematics unit of the vehicle.

12. The system of claim 11, further comprising:
a first memory disposed at the vehicle and configured to store the first key; and
a second memory disposed at the service provider and configured to store the second key.

13. The system of claim 11, wherein the processor is further configured to pair the vehicle and the service provider via the remote server using the additional vehicle information and the additional service provider information.

14. The system of claim 11, wherein different service providers of a particular brand of vehicle are assigned a same, common second address corresponding to the particular brand.

15. A method for facilitating communications between a vehicle having a first communication device with a first address and a service provider having a second communication device with a second address, the method comprising the steps of:
- obtaining the first address and the second address, along with additional vehicle information pertaining to the vehicle and additional service provider information pertaining to the service provider, via a remote server at a remote location that is remote to both the vehicle and the service provider;
- generating a set of pairing keys via the remote server using the first address and the second address, the set of pairing keys comprising:
  - a first key for use by the vehicle in establishing communications with the service provider; and
  - a second key for use by the service provider in establishing communications with the vehicle;
- providing the first key to the vehicle;
- providing the second key to the service provider;
- facilitating information flow between the vehicle and the service provider via the remote server using the additional vehicle information and the additional service provider information;
- receiving a notification as to a communication connection between the first communication device and the second communication device; and
- providing instructions to facilitate a flow of information between the first communication device and the second communication device based on the notification, the first address, and the second address;

wherein the step of providing instructions comprises the step of providing a description of goods or services offered by the service provider from the remote server to the vehicle using the additional service provider information.

* * * * *